United States Patent
Yen et al.

(10) Patent No.: US 11,239,036 B2
(45) Date of Patent: Feb. 1, 2022

(54) KEY ASSEMBLY

(71) Applicants: LITE-ON ELECTRONICS (GUANGZHOU) LIMITED, Guangzhou (CN); Lite-On Technology Corporation, Taipei (TW)

(72) Inventors: Ming-Fu Yen, Taipei (TW); Wei-Pin Chuang, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 17/024,710

(22) Filed: Sep. 18, 2020

(65) Prior Publication Data

US 2021/0090826 A1 Mar. 25, 2021

Related U.S. Application Data

(60) Provisional application No. 62/903,766, filed on Sep. 21, 2019.

(30) Foreign Application Priority Data

Jul. 9, 2020 (CN) .......................... 202010656268.6

(51) Int. Cl.
*H01H 13/70* (2006.01)
*H01H 13/705* (2006.01)
(Continued)

(52) U.S. Cl.
CPC ......... *H01H 13/705* (2013.01); *G06F 3/0213* (2013.01); *H01H 3/122* (2013.01);
(Continued)

(58) Field of Classification Search
CPC ........ H01H 13/705; H01H 3/125; H01H 9/02; H01H 13/12
(Continued)

(56) References Cited

U.S. PATENT DOCUMENTS

2012/0048698 A1* 3/2012 Yen .................... H01H 3/122
200/344
2014/0034472 A1* 2/2014 Krumpelman ......... H01H 13/70
200/5 A
(Continued)

*Primary Examiner* — Edwin A. Leon
*Assistant Examiner* — Iman Malakooti
(74) *Attorney, Agent, or Firm* — JCIPRNET

(57) ABSTRACT

The disclosure provides a key assembly, including: a baseplate, having a top surface and a recess groove recessed from the top surface, in which the recess groove is a blind hole; a hook, disposed on the baseplate, and extending upward from the top surface to form a hole between the hook and the top surface, in which an orthographic projection range of the hook and an orthographic projection range of the recess groove do not overlap each other; a key cap, disposed on the baseplate; an elastic member, disposed between the key cap and the baseplate; a link bar, connecting the key cap and the baseplate, in which the link bar has an extension portion passing through the hole; and a membrane, disposed on the top surface of the baseplate, in which the membrane covers at least part of the recess groove, and the extension portion abuts the membrane.

12 Claims, 10 Drawing Sheets

(51) Int. Cl.
*H01H 3/12* (2006.01)
*H01H 9/02* (2006.01)
*H01H 13/12* (2006.01)
*H01H 21/24* (2006.01)
*H01H 21/36* (2006.01)
*G06F 3/02* (2006.01)
*H01H 13/703* (2006.01)
*H01H 13/7065* (2006.01)

(52) U.S. Cl.
CPC .............. *H01H 3/125* (2013.01); *H01H 9/02* (2013.01); *H01H 13/12* (2013.01); *H01H 13/703* (2013.01); *H01H 13/7065* (2013.01); *H01H 21/24* (2013.01); *H01H 21/36* (2013.01); *H01H 2009/0278* (2013.01)

(58) Field of Classification Search
USPC .................................................. 200/5 A, 341
See application file for complete search history.

(56) References Cited

U.S. PATENT DOCUMENTS

| | | | |
|---|---|---|---|
| 2014/0151204 A1* | 6/2014 | Chen | H01H 13/85 200/310 |
| 2017/0191612 A1* | 7/2017 | Yen | F16M 13/02 |
| 2017/0278649 A1* | 9/2017 | Liu | H01H 13/14 |

* cited by examiner

KEY ASSEMBLY

CROSS-REFERENCE TO RELATED APPLICATION

This application claims the priority benefits of U.S. provisional application Ser. No. 62/903,766, filed on Sep. 21, 2019, and China application serial no. 202010656268.6, filed on Jul. 9, 2020. The entirety of each of the above-mentioned patent applications is hereby incorporated by reference herein and made a part of this specification.

BACKGROUND

Technical Field

The disclosure relates to a key assembly, particularly to a key assembly with a noise-reduction effect.

Description of Related Art

In terms of the usage habit of personal computers, keyboards serve for the convenience of inputting text, symbols, or numbers, and hence a keyboard is one of the most indispensable input device of a computer.

Most of the keys on the keyboard are in a square shape. Among them, a few of the keys, such as the space bar, the Enter key, the Caps Lock, the Shift key, etc., are termed multiple-width keys because the length of those key caps are greater than their width.

Conventional multiple-width keys usually include a link bar and other components. When a multiple-width key as such is pressed, the link bar is pressed/released and collides directly with the baseplate and the hook, producing evident noise, since the link bar and the hook are usually assembled loosely to each other (that is, the hole size of the hook is slightly larger than the diameter of the link bar). Therefore, it is an urgent issue to solve such noise at present.

SUMMARY

Accordingly, the disclosure provides a key assembly with a noise-reduction effect.

According to an embodiment of the disclosure, a key assembly includes: a baseplate having a top surface and a recess groove recessed from the top surface, in which the recess groove is a blind hole; a hook, disposed on the baseplate, and extending upward from the top surface to form a hole between the hook and the top surface, in which an orthographic projection range of the hook and an orthographic projection range of the recess groove do not overlap each other; a key cap, disposed on the baseplate; an elastic member, disposed between the key cap and the baseplate; a link bar, connecting the key cap and the baseplate, in which the link bar has an extension portion passing through the hole; and a membrane, disposed on the top surface of the baseplate, in which the membrane covers at least part of the recess groove, and the extension portion abuts the membrane.

In an embodiment of a key assembly according to the disclosure, the membrane covers all parts of the recess groove.

In an embodiment of a key assembly according to the disclosure, the material of the baseplate is metal.

In an embodiment of a key assembly according to the disclosure, the hook is formed by stamping and bending part of the baseplate.

In an embodiment of a key assembly according to the disclosure, the hook is made of plastic materials, and the hook and the baseplate are embedded together.

In an embodiment of a key assembly according to the disclosure, the membrane is a thin-film circuit board disposed on the top surface of the baseplate, in which the elastic member is disposed on the thin-film circuit board.

In an embodiment of a key assembly according to the disclosure, the thin-film circuit board includes a switch, and when the key cap moves downward and triggers the switch, the switch generates a conduction signal.

In an embodiment of a key assembly according to the disclosure, the membrane is a polyester film or a rubber sheet.

In an embodiment of a key assembly according to the disclosure, the membrane has elasticity and provides restoring force for the key cap to move upward.

In an embodiment of a key assembly according to the disclosure, a support disposed between the key cap and the baseplate is further included.

According to an embodiment of the disclosure, a key assembly includes: a baseplate having a top surface and a first recess groove and a second recess groove recessed from the top surface, in which the first recess groove and the second recess groove are blind holes; a hook, disposed to the baseplate and extending upward from the top surface to form a first hole and a second hole between the hook and the top surface, in which an orthographic projection range of the hook and orthographic projection ranges of the first recess groove and the second recess groove do not overlap one another; a key cap, disposed on the baseplate; an elastic member, disposed between the key cap and the baseplate; a first link bar and a second link bar, connecting the key cap and the baseplate, in which the first link bar and the second link bar each include an extension portion, the extension portion pass respectively through the first hole and the second hole, and the first link bar and the second link bar are disposed symmetrically; and a membrane, disposed on the top surface of the baseplate, in which the membrane covers respectively at least part of the first recess groove and part of the second recess groove, and the extension portion of the first link bar and the extension portion of the second link bar abut the membrane respectively.

In an embodiment of a key assembly according to the disclosure, each of the first link bar and the second link bar has a rod portion and a pair of connecting portions, in which the pair of connecting portions connects both ends of the rod portion, the pair of connecting portions has the extension portions extending toward each other, and the extension portions are embedded correspondingly into the first hole and the second hole.

According to an embodiment of the disclosure, a key assembly includes: a baseplate having a top surface and a recess space recessed from the top surface; a hook, extending upward from the top surface to form a hole between the top surface and the hook, in which the recess space is formed on the top surface and be adjacent to the hole; a key cap, disposed on the baseplate; an elastic member, disposed between the key cap and the baseplate; a link bar, connecting the key cap and the baseplate, including a pair of connecting portions and a rod portion, in which the connecting portions are parallel to each other, the rod portion is connected between the connecting portions, the connecting portion have an end portion and a bent portion, the end portion is embedded correspondingly into the hole, the bent portion is bent toward the recess space, and the orthographic projection range of the bent portion is located correspondingly in the recess space; and a membrane, disposed on the top surface of the baseplate, and extending into the hole.

In an embodiment of a key assembly according to the disclosure, the recess space is an open hole, and an orthographic projection range of the hook and an orthographic projection range of a recess space overlap each other.

In an embodiment of a key assembly according to the disclosure, the recess space is an open hole, and the baseplate further has a parting section, and the parting section is disposed between the hook and the recess space, such that the hook and the recess space are clearly separated.

In an embodiment of a key assembly according to the disclosure, a material of the baseplate is metal.

In an embodiment of a key assembly according to the disclosure, the hook is formed by stamping and bending part of the baseplate.

In an embodiment of a key assembly according to the disclosure, the hook is made of plastic materials, and the hook and the baseplate are embedded together.

In an embodiment of a key assembly according to the disclosure, when the key cap moves downward, the bent portion abuts the membrane.

In an embodiment of a key assembly according to the disclosure, the membrane is a thin-film circuit board disposed on the top surface of the baseplate, in which the elastic member is disposed on the thin-film circuit board.

In an embodiment of a key assembly according to the disclosure, the thin-film circuit board has a switch, and when the key cap moves downward and triggers the switch, the switch generates a conduction signal.

In an embodiment of a key assembly according to the disclosure, the membrane is a polyester film or a rubber sheet.

In an embodiment of a key assembly according to the disclosure, the membrane has elasticity and provides restoring force for the key cap to move upward.

In an embodiment of a key assembly according to the disclosure, a support disposed between the key cap and the baseplate is further included.

According to an embodiment of the disclosure, a key assembly includes: a baseplate having a top surface and a first recess space and a second recess space recessed from the top surface, a hook, extending upward from the top surface to form a first hole and a second hole between the top surface and the hook, in which the first recess space is formed on the top surface and is adjacent to the first hole, and the second recess space is formed on the top surface and is adjacent to the second hole; a key cap, disposed on the baseplate; an elastic member, disposed between the key cap and the baseplate; and a first link bar and a second link bar, connecting the key cap and the baseplate, in which each of the first link bar and the second link bar has a pair of connecting portions and a rod portion, the connecting portions are parallel to each other, the rod portion is connected between the connecting portions, the connecting portion has an end portion and a bent portion, the end portions extend toward each other and are embedded correspondingly into the first hole and the second hole, and the bent portion is bent toward the corresponding first recess space or the corresponding second space, and an orthographic projection range of the bent portion is located correspondingly in an orthographic projection ranges of the first recess space or the second space; and a membrane, disposed on the top surface of the baseplate, and extending into the first hole and the second hole.

BRIEF DESCRIPTION OF THE DRAWINGS

Figure 1:
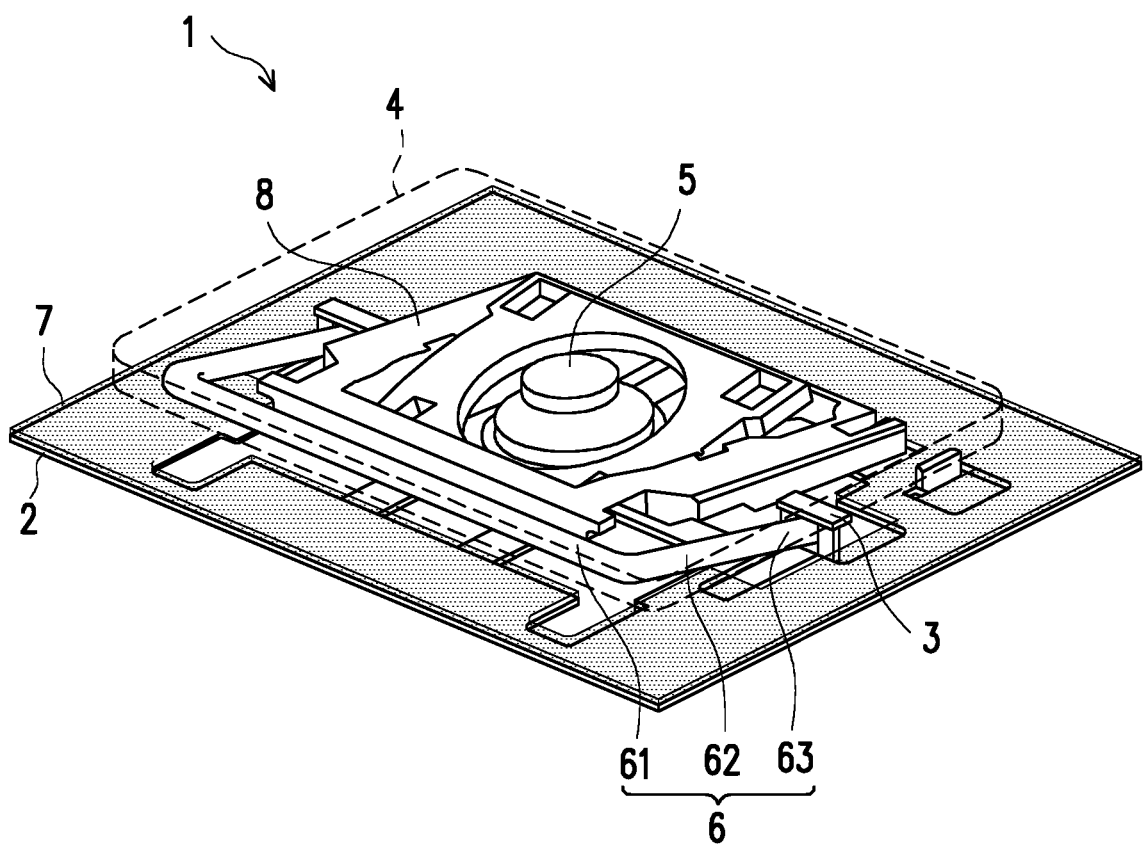
FIG. 1 is a schematic view of a key assembly of the first Embodiment of the disclosure.

Reference is now be made in detail to exemplary embodiments of the disclosure, and elucidations of the exemplary embodiments are as illustrated in the drawings. Wherever possible, the same component symbols in the drawings and descriptions are to indicate the same or similar parts.

The key assembly of the disclosure allows the components to cooperate with each other and achieves an effective noise-reduction effect by changing the design of the architecture. Several embodiments are laid out below for descriptions with further details. Those skilled in the art may make corresponding modifications according to their actual needs without departing from the spirit of the disclosure.

The following is the description of the first Embodiment.

Figure 2:
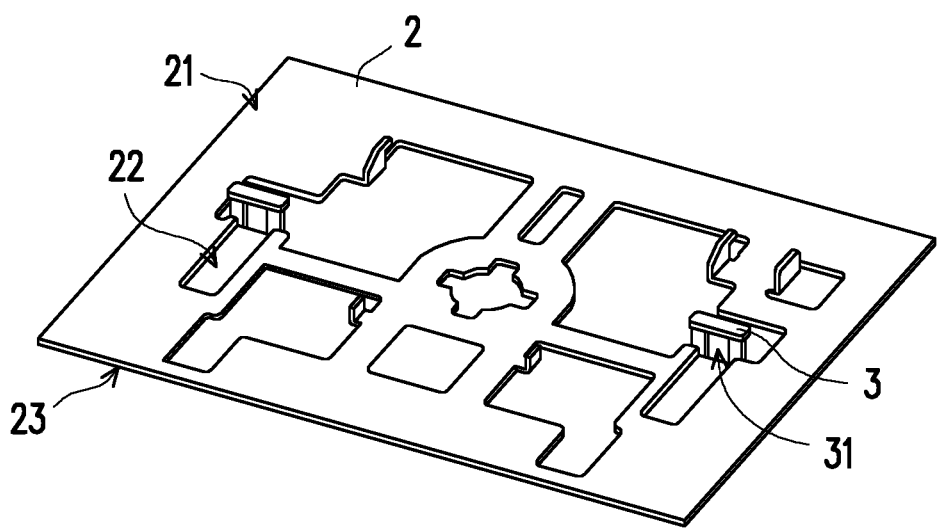
FIG. 2 is a schematic view of the baseplate according to FIG. 1.
Figure 3:
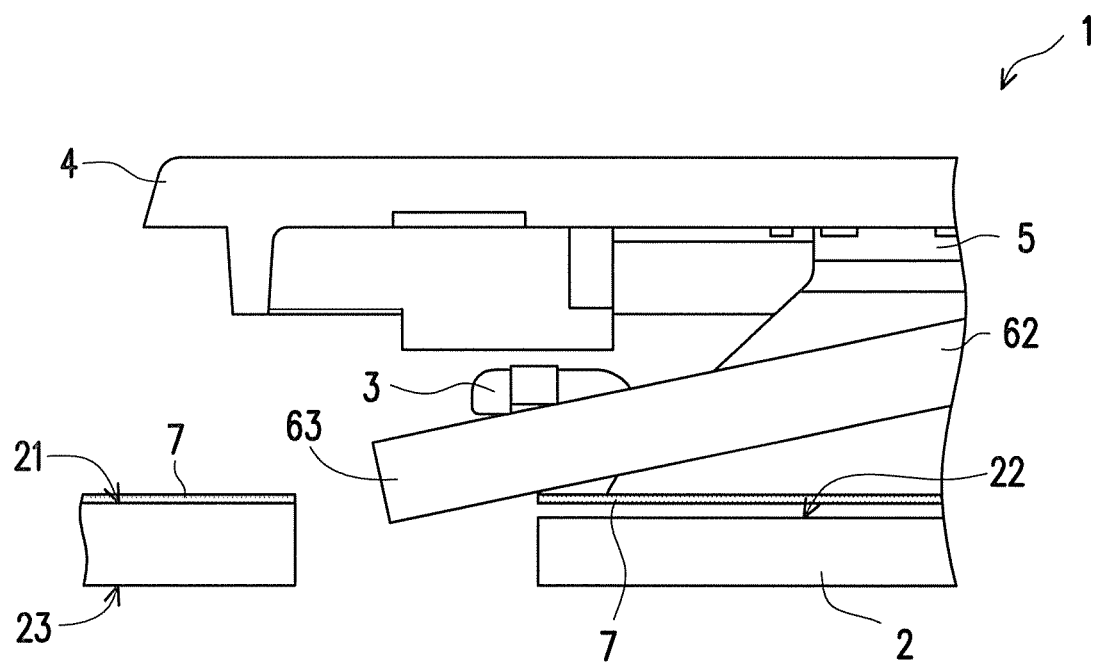
FIG. 3 is a schematic view of part of FIG. 1.

FIG. 1 is a schematic view of a key assembly of the first Embodiment of the disclosure. FIG. 2 is a schematic view of the baseplate according to FIG. 1. And FIG. 3 is a schematic view of part of FIG. 1. Please refer to FIG. 1, FIG. 2, and FIG. 3 at the same time. A key assembly 1 of the present embodiment includes a baseplate 2, a hook 3, a key cap 4, an elastic member 5, a link bar 6, and a membrane 7.

The baseplate 2 has a top surface 21 and a recess groove 22 recessed from the top surface 21, in which the recess groove 22 is a blind hole. The hook 3 is disposed on the baseplate 2 and extends upward from the top surface 21 to form a hole 31 between the hook 3 and the top surface 21, in which the orthographic projection range of the hook 3 and the orthographic projection range of the recess groove 22 do not overlap each other.

The blind hole mentioned above refers to a hole which is formed without penetrating the top surface 21 and a bottom surface 23 of the baseplate 2. Instead, the blind hole is formed by stamping or other means of the like to form an indentation on the top surface 21. In contrast, an open hole or a through hole refers to a hole that penetrates the top surface 21 and the bottom surface 23 of the baseplate 2. One of the benefits of the recess groove 22 in the form of a blind hole is that it increases the overall rigidity of the baseplate 2, preventing the baseplate 2 from being too soft.

In one embodiment, the material of the baseplate 2 may be metal, in which part of the baseplate 2 is stamped and bent to form the aforementioned hook 3. In other words, the hook 3 and the baseplate 2 are made of the same material.

In another embodiment which is not illustrated herein, the material of the hook 3 may be selected from resin materials, in which the hook 3 may be formed on the baseplate 2 by double injection; alternatively, the hook 3 may also be embedded together with the baseplate 2 via the fitting of structures.

Please continue to refer to FIG. 1, FIG. 2, and FIG. 3, in which the key cap 4 is disposed on the baseplate 2, and the elastic member 5 is disposed between the key cap 4 and the baseplate 2. The link bar 6 connects the key cap 4 and the baseplate 2, in which the link bar 6 has an extension portion 63 passing through the hole 31. The membrane 7 is disposed on the top surface 21 of the baseplate 2, in which the membrane 7 covers at least part of the recess groove 22, and the extension portion 63 abuts the membrane 7.

The key cap 4 is generally in a square shape, which may be square or rectangular, and may be selected according to needs. Furthermore, the link bar 6 has a rod portion 61 and a pair of connecting portions 62, in which the rod portion 61 is connected between the pair of connecting portions 62, and the link bar 6 is assembled to the key cap 4 via the rod portion 61, and the aforementioned extension portion 63 is located at an end of the connecting portion 62 which is relatively away from the rod portion 61. In the present embodiment, the shape of the link bar 6 is generally C-shaped.

The aforementioned membrane 7 is a polyester film or a rubber sheet.

In an embodiment, the membrane 7 and the thin-film circuit board are two components disposed separately and are disposed respectively on the two opposite surfaces of the baseplate 2. Specifically speaking, the membrane 7 is disposed on the top surface 21 of the baseplate 2, and the thin-film circuit board is disposed on the bottom surface 23 of the baseplate 2.

In another embodiment, the membrane 7 may be integrated directly with the thin-film circuit board, such that the thin-film circuit board is disposed on the top surface 21 of the baseplate 2, and the elastic member 5 is disposed on the thin-film circuit board. The aforementioned thin-film circuit board has a switch (not labeled in the figures), and when the key cap 4 moves downward and triggers the switch, the switch generates a conduction signal. According to the above, in an embodiment, the elastic member 5 may be directly disposed above the membrane 7.

In addition, the key assembly 1 further includes a support 8 disposed between the key cap 4 and the baseplate 2.

Please continue to refer to FIG. 1, FIG. 2 and FIG. 3. When the key cap 4 of the key assembly 1 is not pressed, the membrane 7 is between the extension portion 63 of the link bar 6 which passing through the hole 31 and the baseplate 2, and the membrane 7 provides a force which supports the link bar 6 upward, such that the link bar 6 is not in contact with the baseplate 2 then.

When the user presses the key cap 4 of the key assembly 1, the key cap 4 is pressed to move toward the baseplate 2. The link bar 6, the elastic member 5, and the support 8 are all then driven by the key cap 4 to perform a change. For example, the link bar 6 and the support 8 are pressed to move toward the baseplate 2, the elastic member 5 is deformed under pressure and stores elastic restoring force, and the key cap 4 triggers the switch of the thin-film circuit board, causing the switch to generate a conduction signal.

At the same time, the membrane 7 continues to provide an upward support for the extension portion 63 of the link bar 6 which passes through the hole 31, such that the extension portion 63 abuts the lower edge of the hook 3, and then, as the key cap 4 continues to move downward, the extension portion 63 abuts the edge of hook 3 and slides, thereby reducing the possibility of the extension portion 63 hitting the hook 3 or the baseplate 2 and achieving the noise-reduction effect.

After the user removes the force from the key cap 4, the elastic restoring force of the elastic member 5 drives the key cap 4 and the support 8 to go back to their original positions, and the membrane 7 is placed on a lower end of the extension portion 63, avoiding the collision between the extension portion 63 and the baseplate 2.

Figure 4:
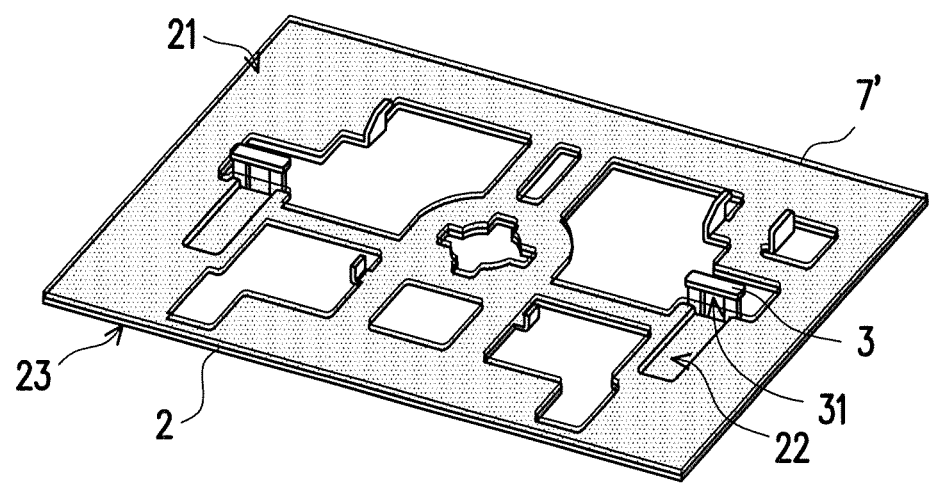
FIG. 4 is a schematic view of the membrane covering all parts of the recess groove.

FIG. 4 is a schematic view of the membrane covering all parts of the recess groove. Please refer to FIG. 4. In another embodiment, a membrane 7' may cover all parts of the recess groove 22. By designing so, when the key cap 4 is pressed to drive the link bar 6, the link bar 6 is prevented more comprehensively from hitting directly the baseplate 2 and the hood 3, thereby achieving the noise-reduction effect in a more effective way.

The following is the description of the second Embodiment.

Figure 5A:
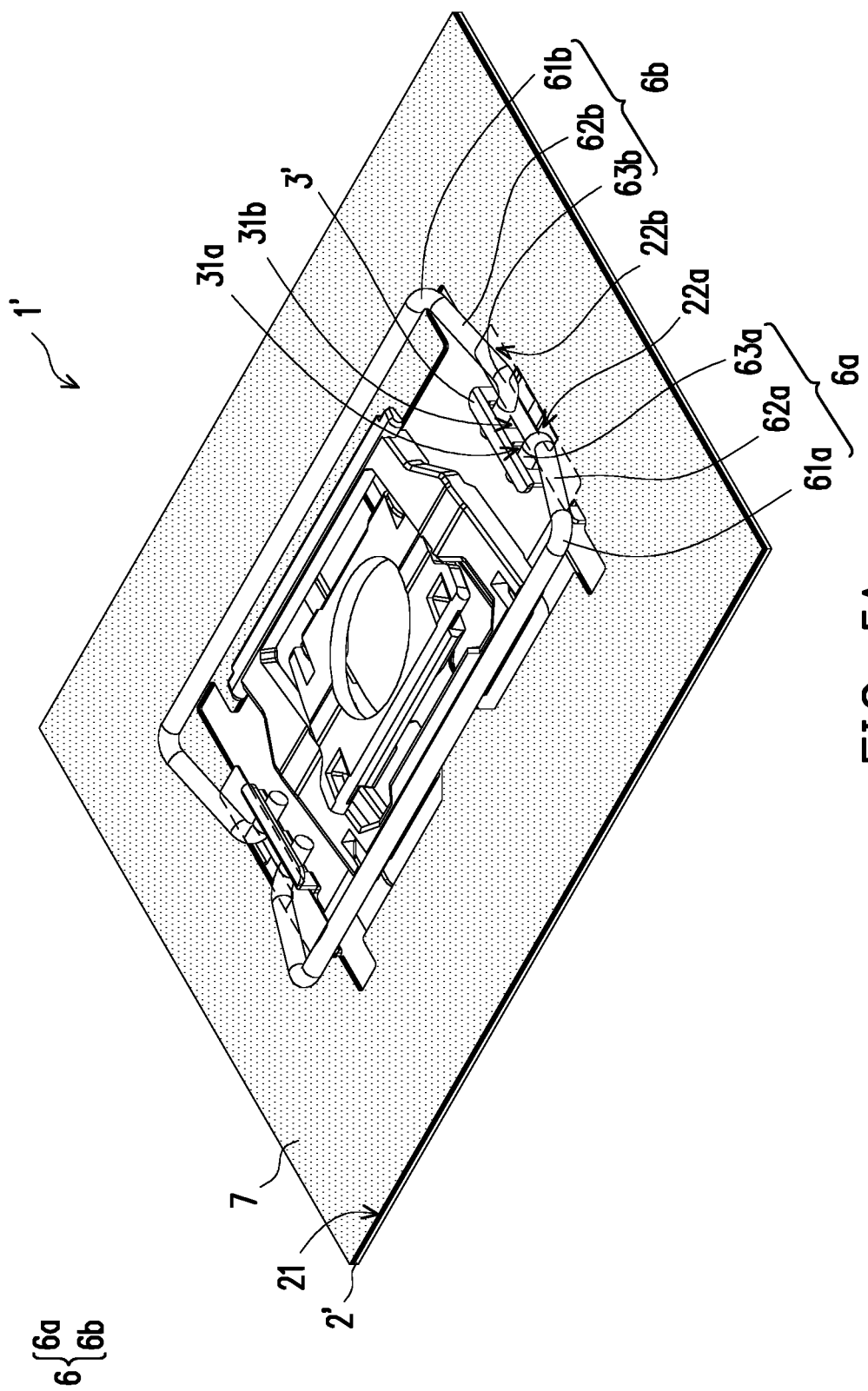
FIG. 5A and FIG. 5B are schematic views of a key assembly of the second Embodiment of the disclosure.
Figure 5B:
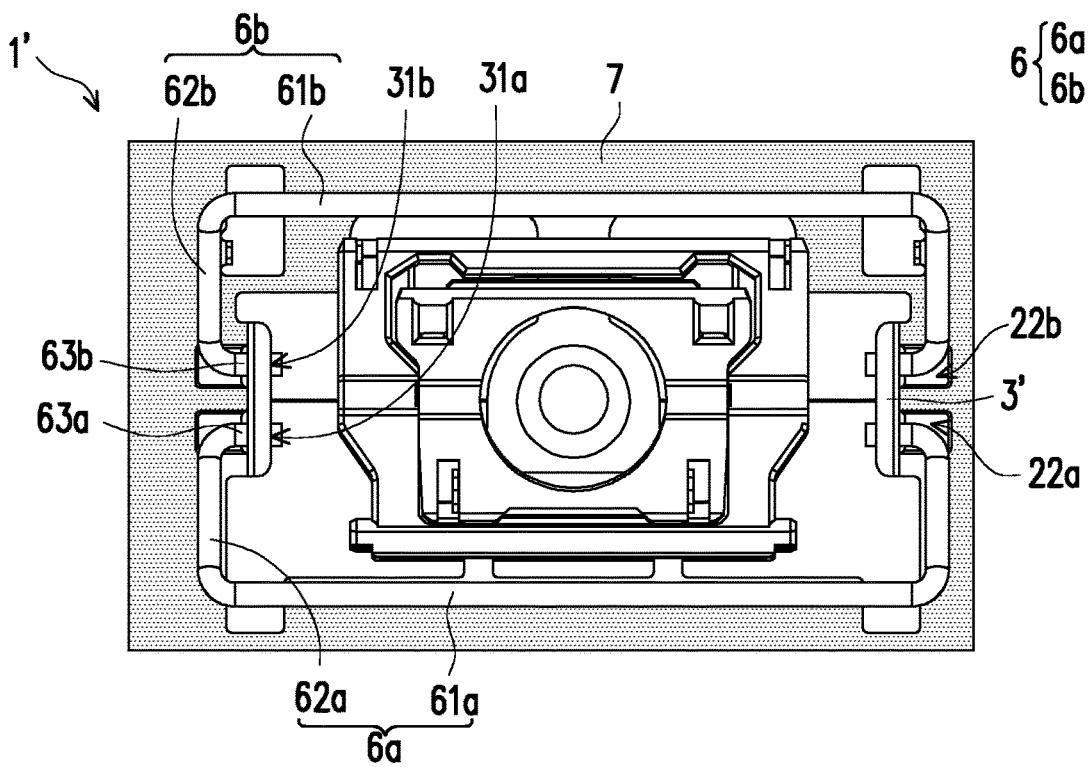

FIG. 5A and FIG. 5B are schematic views of a key assembly of the second Embodiment of the disclosure. Please refer to FIG. 5A and FIG. 5B at the same time. The present embodiment is substantially the same as the first Embodiment described above. The difference is that a key assembly 1' of the present embodiment has a pair of link bars 6, in which the link bars in the present embodiment are U-shaped, which is different from the C-shaped link bar of the first Embodiment as described above. Furthermore, in response to the configuration of the pair of link bars 6, the corresponding structure and components have also changed accordingly.

Specifically speaking, a baseplate 2' of the present embodiment includes: a first recess groove 22a and a second recess groove 22b; a hook 3', extending upward from the top surface 21 of the baseplate 2' to form a first hole 31a and a second hole 31b between the top surface 21 and the hook 3', in which the orthographic projection range of the hook 3' and the orthographic projection ranges of the first recess groove 22a and the second recess groove 22b do not overlap one another; and a first link bar 6a and a second link bar 6b, disposed symmetrically with each other, in which extension portions 63a and 63b of the first link bar 6a and the second link bar 6b pass respectively through a first hole 31a and a second hole 31b.

The first link bar 6a has a rod portion 61a and a pair of connecting portions 62a, and the connecting portions 62a connect both ends of the rod portion 61a. The extension portion 63a is located at an end of the connecting portion 62a which is relatively away from the rod portion 61a, and the extension portions 63a extend toward each other substantially in a direction parallel to the rod portion 61a and are embedded correspondingly in the first holes 31a of two hooks 3' disposed on opposite sides. As described above, the shape of the first link bar 6a is generally U-shaped.

Similarly, the second link bar 6b has a rod portion 61b and a pair of connecting portions 62b, and the connecting portions 62b connect both ends of the rod portion 61a. The extension portion 63b is located at an end of the connecting portion 62b which is relatively away from the rod portion 61b, and the extension portions 63b extend toward each other substantially in a direction parallel to the rod portion 61b and are embedded correspondingly in the second holes 31b of two hooks 3' disposed on opposite sides. As described above, the shape of the second link bar 6b is the same as the shape of the first link bar 6a, which is also U-shaped. In the present embodiment, the membrane 7 is between the extension portions 63a and 63b and the recess grooves 22a and 22b. Thus, when the user presses the key cap 4, the extension portions 63a and 63b are affected by the membrane 7 to abut the edge of the hook 3' and rotate along the holes 31a and 31b, preventing the link bar 6a and the link bar 6b from hitting the hook 3'. And when the user releases the key cap 4, the membrane 7 is placed under the extension portions 63a and 63b to prevent the link bar 6a and the link bar 6b from hitting the baseplate 2.

The following is the description of the third Embodiment.

Figure 6:
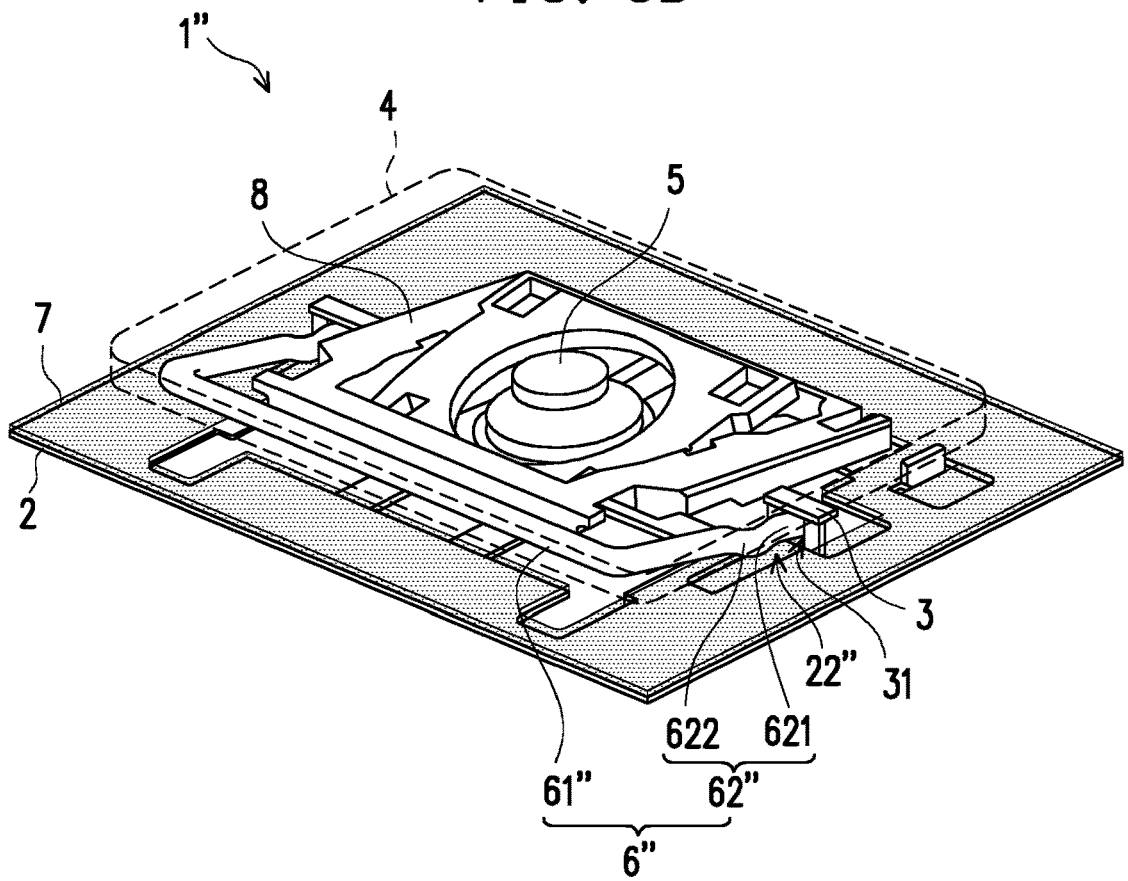
FIG. 6 is a schematic view of a key assembly of the third Embodiment of the disclosure.
Figure 7A:
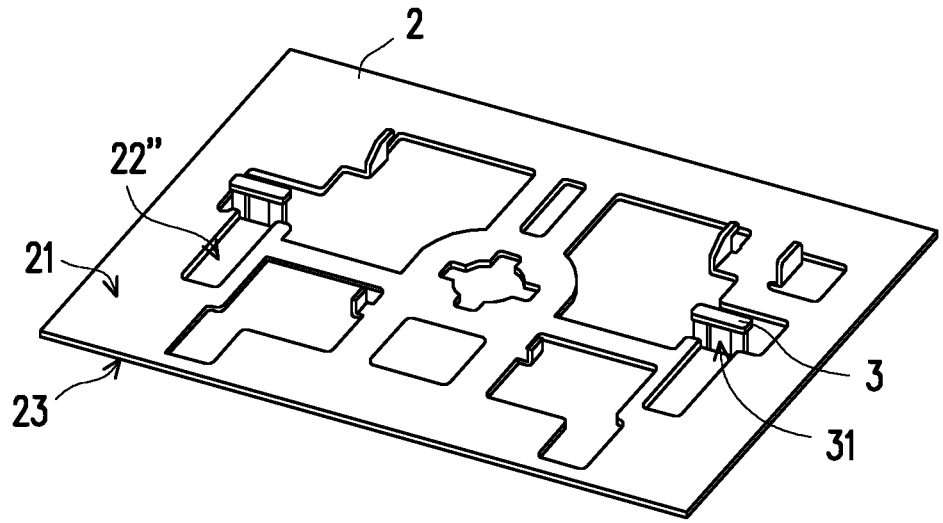
FIG. 7A is a schematic view of an embodiment of the baseplate according to FIG. 6.
Figure 8A:
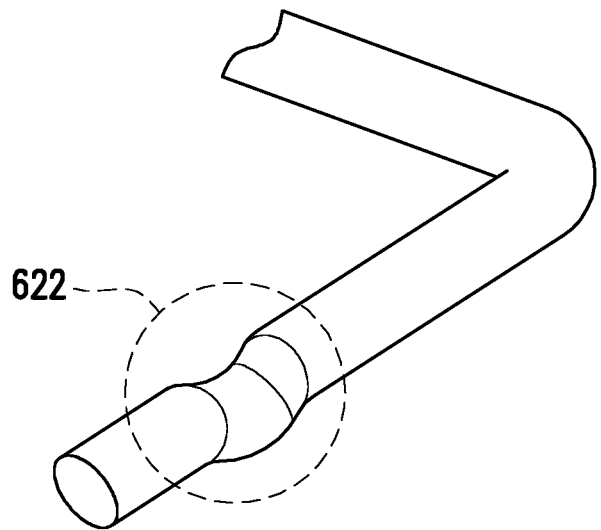
FIG. 8A is a schematic view of the link bar according to FIG. 6.

FIG. 6 is a schematic view of a key assembly of the third Embodiment of the disclosure. FIG. 7A is a schematic view of an embodiment of the baseplate according to FIG. 6. And FIG. 8A is a schematic view of the link bar according to FIG. 6. Please refer to FIG. 6, FIG. 7A, and FIG. 8A at the same time. A key assembly 1" of the present embodiment includes a baseplate 2, a hook 3, a key cap 4, an elastic member 5, a link bar 6, and a membrane 7.

The baseplate 2 has a top surface 21 and a recess space 22" recessed from the top surface 21, in which the recess space 22" is a blind hole as in the embodiment indicated in FIG. 7A. The hook 3 extends upward from the top surface 21 to form a hole 31 between the top surface 21 and the hook 3, and the recess space 22" is disposed to the top surface 21 and is adjacent to the hole 31. The blind hole mentioned above refers to a hole which is formed without penetrating the top surface 21 and a bottom surface 23 of the baseplate 2. Instead, the blind hole is formed by stamping or other means of the like to form an indentation on the top surface 21.

In one embodiment, the material of the baseplate 2 may be metal, in which part of the baseplate 2 is stamped and bent to form the aforementioned hook 3. In other words, the hook 3 and the baseplate 2 are made of the same material.

In another embodiment, the material of the hook 3 may be selected from plastic materials, in which the hook 3 may be formed on the baseplate 2 by double injection; alternatively, the hook 3 may also be embedded together with the baseplate 2 via fitting of structures.

Please continue to refer to FIG. 6, FIG. 7A, and FIG. 8A, in which the key cap 4 is disposed on the baseplate 2, and the elastic member 5 is disposed between the key cap 4 and the baseplate 2. A link bar 6" connects the key cap 4 and the baseplate 2. The link bar 6" has a pair of connecting portions 62" and a rod portion 61", in which the connecting portions 62" are parallel to each other, and the rod portion 61" is connected between the connecting portions 62", such that the link bar 6" is generally C-shaped. The connecting portion 62" have an end portion 621 and a bent portion 622, in which the bent portion 622 is located between the rod portion 61" and the end portion 621 and is disposed to be adjacent to the end portion 621. And the end portion 621 is embedded correspondingly in the hole 31, and the bent portion 622 is bent toward the recess space 22", and the orthographic projection range of the bent portion 622 is located correspondingly in the recess space 22". The membrane 7 is disposed on the top surface 21 of the baseplate 2, and the membrane 7 extends into the hole 31.

It can be seen from the above that the structure of the link bar 6" of the present embodiment is different from the structures of the link bars of the first and the second Embodiments described above. The connecting portion 62" of the link bar 6" of the present embodiment further has the bent portion 622 bent toward the recess space 22".

When the key cap 4 is pressed, the configuration of the bent portion 622 makes the bent portion 622 itself first abuts the membrane 7 in the recess space 22" along with the movement of the link bar 6" toward the baseplate 2, and by the force between the two, the end portion 621 continues to bear against the edge of the hook 3, preventing the end portion 621 from hitting the hook 3 and making a noise. Conversely, when the key cap 4 is released, the end portion 621 does not hit the baseplate 2 due to the bending.

Figure 7B:
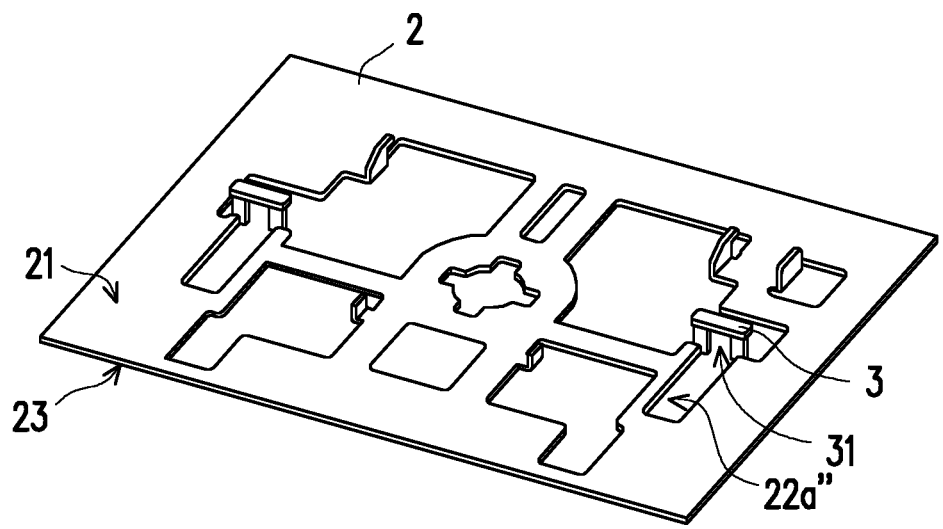
FIG. 7B is a schematic view of another embodiment of the baseplate.

FIG. 7B is a schematic view of another embodiment of the baseplate. In the embodiment shown in FIG. 7B, a recess space 22a" is an open hole, and the orthographic projection range of the hook 3 and the orthographic projection range of a recess space 22a" overlap each other.

Figure 7C:
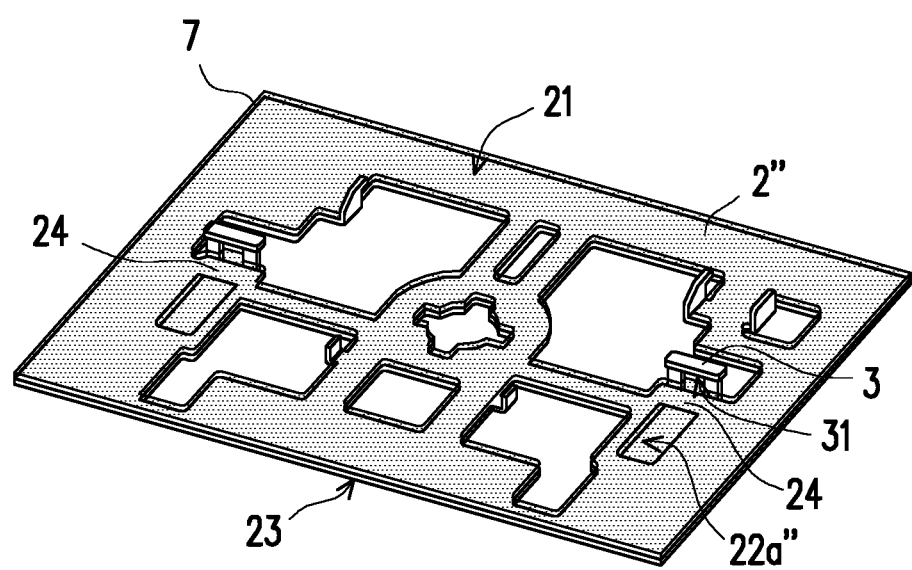
FIG. 7C is a schematic view of yet another embodiment of the baseplate.

FIG. 7C is a schematic view of yet another embodiment of the baseplate. In the embodiment shown in FIG. 7C, the recess space 22a" is an open hole, and a baseplate 2" further has a parting section 24. The parting section 24 is disposed between the hook 3 and the recess space 22a", such that the hook 3 and the recess space 22a" are clearly separated. In particular, since the membrane 7 extends further into the hole 31, when the key assembly 1" operates (please refer to FIG. 6), the end portion 621 of the connecting portion 62" of the link bar 6" is prevented from hitting the edge of the parting section 24.

Figure 8B:
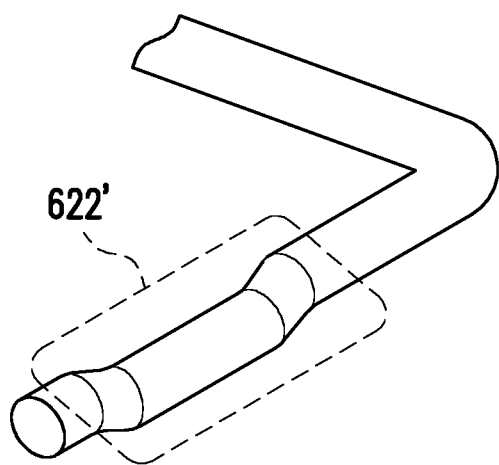
FIG. 8B is a schematic view of another embodiment of the bent portion.

FIG. 8B is a schematic view of another embodiment of the bent portion. Please refer to FIG. 6, FIG. 8A, and FIG. 8B at the same time. The proportion of the bent portion 622 in the connecting portion 62 may be changed according to actual needs. The bent portion 622 shown in FIG. 8A has a relatively smaller proportion in the connecting portion 62 whereas a bent portion 622' shown in FIG. 8B has a relatively larger portion in the connecting portion 62, and the size of the corresponding recess space 22" may also be changed correspondingly according to the size of the bent portion 622'.

It should be noted that although the present embodiment exemplifies the use of the bent link bar 6" to be adapted to match the baseplate 2 having a recess groove 22 as an example, in some embodiments which are not shown herein, the link bar 6" may be adapted on the baseplate 2 without a recess groove, and modifications as such are all within the scope of the disclosure.

The following is the description of the fourth Embodiment.

Figure 9A:
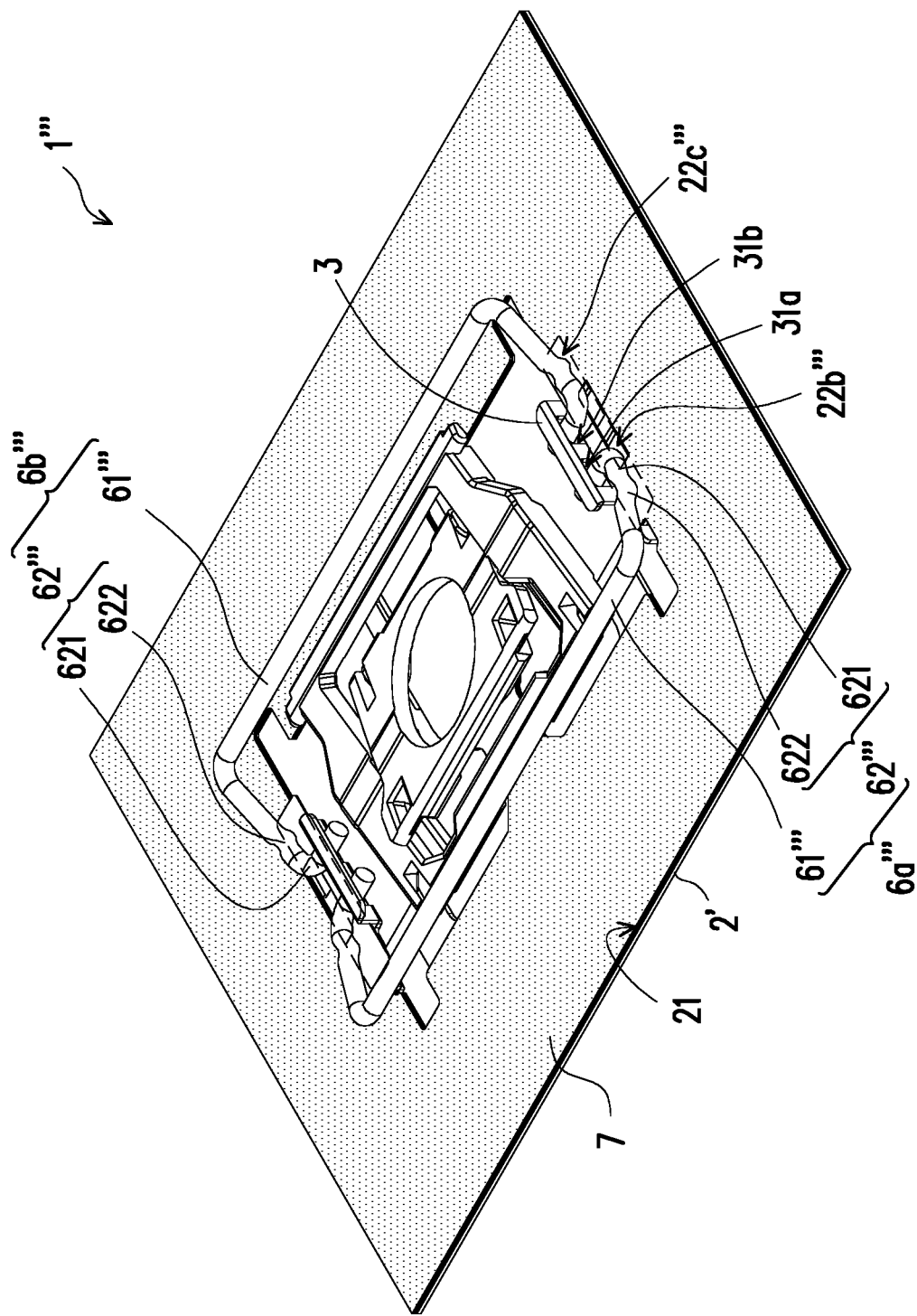
FIG. 9A and FIG. 9B are schematic views of a key assembly of the fourth Embodiment of the disclosure.
Figure 9B:
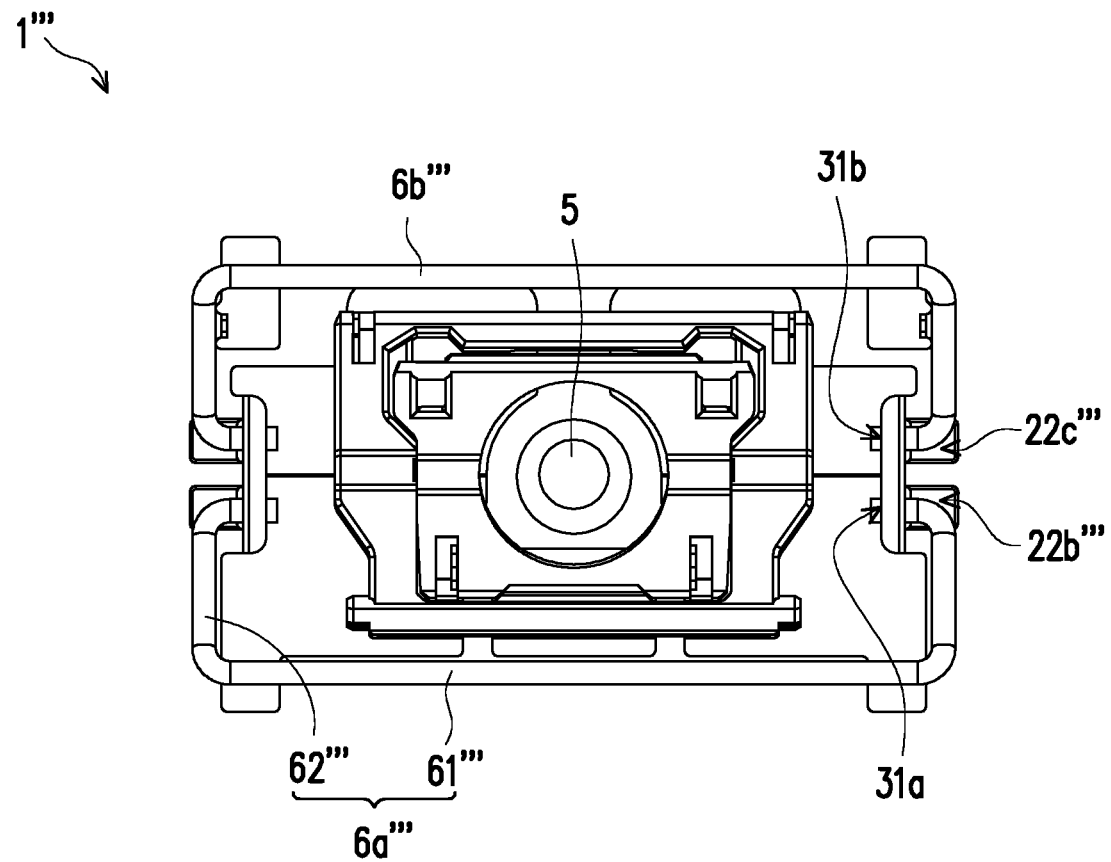

FIG. 9A and FIG. 9B are schematic views of a key assembly of the fourth Embodiment of the disclosure. The present embodiment is substantially the same as the third Embodiment described above. The difference is that a key assembly 1''' of the present embodiment includes a pair of link bars, in which the link bars of the present embodiment are U-shaped, which is different from the C-shaped link bar of the third Embodiment as described above. Furthermore, in response to the configuration of the pair of link bars, the corresponding structure and components have also changed accordingly.

Specifically speaking, a baseplate 2' of the present embodiment includes: a first recess space 22b''' and a second recess groove 22c''' recessed from a top surface 21; a hook 3, extending upward from the top surface 21 to form a first hole 31a and a second hole 31b between the top surface 21 and the hook 3, in which the first recess space 22b''' is disposed on the top surface 21 and is adjacent to the first hole 31a, and the second recess space 22c''' is disposed on the top surface 21 and is adjacent to the second hole 31b; a first link bar 6a''' and a second link bar 6b''', each having a pair of connecting portions 62''' and a rod portion 61''', in which the connecting portions 62''' are parallel to each other, and the rod portion 61''' is connected between the connecting portions 62''', the connecting portion 62 has an end portion 621 and a bent portion 622, the end portions 621 extend toward each other and are embedded correspondingly into the first hole 31a or the second hole 31b, the bent portion 622 is bent toward the corresponding first recess space 22b''' or the second recess space 22c''', and the orthographic projection range of the bent portion 622 is located correspondingly in the orthographic projection ranges of the first recess space 22b''' and the second recess space 22c'''; and a membrane 7, disposed on the top surface 21 of the baseplate 2, and extending into the first hole 31a and the second hole 31b.

Figure 10A:
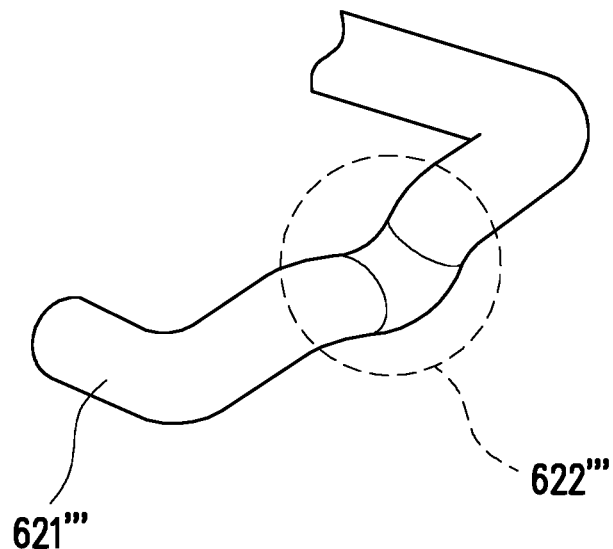
FIG. 10A and FIG. 10B are schematic views of the link bar of different embodiments of the disclosure.
Figure 10B:
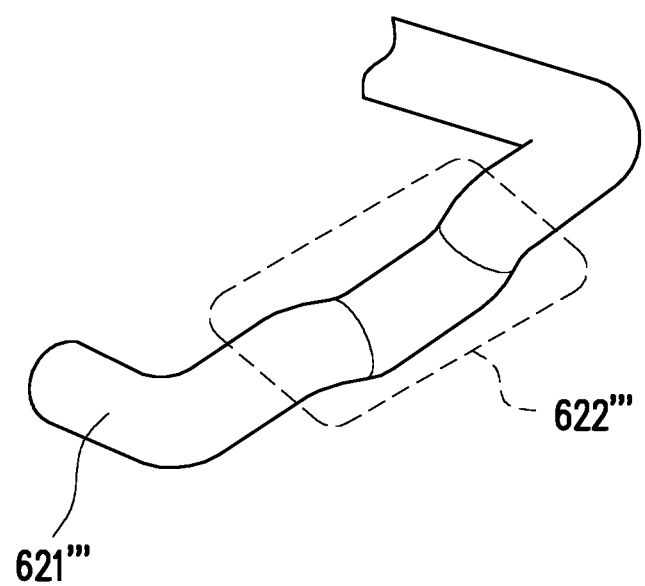

FIG. 10A and FIG. 10B are schematic views of the link bar of different embodiments of the disclosure. Similar to the third Embodiment described above, the connecting portions 62''' of the first link bar 6a''' and the second link bar 6b''' of the present embodiment have the bent portions 622''' bent toward the corresponding first recess space 22b''' or the second recess space 22c'''. However, its difference from the third Embodiment is that the connection portions 62''' of the first link bar 6a''' and the second link bar 6b''' of the present embodiment further have an end portion 621''', in which the end portion 621''' is substantially parallel to the rod portion 61'''. As can be seen from FIG. 10A and FIG. 10B, the proportion of the bent portion 622''' in the connecting portion 62''' (please refer to FIG. 9A and FIG. 9B) may be changed according to needs.

As can be seen from the above, the key assembly of the disclosure has the noise-reduction effect by improving the structure of components and the structure of configuration.

Lastly, it should be noted that the above embodiments are only used to illustrate the technical solution of the disclosure, rather than limiting the disclosure. Although the disclosure has been described in detail with reference to the foregoing embodiments, persons skilled in the art should understand that the technical solutions described in the foregoing embodiments may still be modified, or some or all of the technical features may also be substituted with equivalent technical solutions. And these modifications or substitutions do not make the essences of the corresponding technical solutions deviate from the range of the technical solutions of the embodiments of the disclosure.

What is claimed is:

1. A key assembly, comprising:
   a baseplate, comprising a top surface and a recess groove recessed from the top surface, wherein the recess groove is a blind hole;
   a hook, disposed on the baseplate, and extending upward from the top surface to form a hole between the hook and the top surface, wherein an orthographic projection range of the hook and an orthographic projection range of the recess groove do not overlap each other;
   a key cap, disposed on the baseplate;
   an elastic member, disposed between the key cap and the baseplate;
   a link bar, connecting the key cap and the baseplate, comprising an extension portion passing through the hole; and
   a membrane, disposed on the top surface of the baseplate, wherein the membrane covers at least part of the recess groove, and the extension portion abuts the membrane.

2. The key assembly according to claim 1, wherein the membrane covers all parts of the recess groove.

3. The key assembly according to claim 1, wherein a material of the baseplate is metal.

4. The key assembly according to claim 3, wherein the hook is formed by stamping and bending part of the baseplate.

5. The key assembly according to claim 1, wherein a material of the hook is plastic, and the hook is embedded together with the baseplate.

6. The key assembly according to claim 1, wherein the membrane is a thin-film circuit board, disposed on the top surface of the baseplate, and the elastic member is disposed on the thin-film circuit board.

7. The key assembly according to claim 6, wherein the thin-film circuit board has a switch, and when the key cap moves downward and triggers the switch, the switch generates a conduction signal.

8. The key assembly according to claim 1, wherein the membrane is a polyester film or a rubber sheet.

9. The key assembly according to claim 1, wherein the membrane has elasticity and provides restoring force for the key cap to move upward.

10. The key assembly according to claim 1, further comprising a support, disposed between the key cap and the baseplate.

11. A key assembly, comprising:
    a baseplate, comprising a top surface and a first recess groove and a second recess groove recessed from the top surface, wherein the first recess groove and the second recess groove are blind holes;
    a hook, disposed on the baseplate and extending upward from the top surface to form a first hole and a second hole between the hook and the top surface, wherein an orthographic projection range of the hook and orthographic projection ranges of the first recess groove and the second recess groove do not overlap one another;
    a key cap, disposed on the baseplate;
    an elastic member, disposed between the key cap and the baseplate;
    a first link bar and a second link bar, connecting the key cap and the baseplate, wherein the first link bar and the second link bar each comprise an extension portion passing respectively through a first hole and a second hole, and the first link bar and the second link bar are disposed symmetrically; and
    a membrane, disposed on the top surface of the baseplate, wherein the membrane covers respectively at least part of the first recess groove and the second recess groove, and the extension portion of the first link bar and the extension portion of the second link bar abut the membrane respectively.

12. The key assembly according to claim 11, wherein each of the first link bar and the second link bar has a rod portion and a pair of connecting portions, the pair of connecting portions connects both ends of the rod portion, the pair of connecting portions has the extension portion extending toward each other, and the extension portions are embedded correspondingly into the first hole and the second hole.

* * * * *